US011112982B2

(12) United States Patent
He et al.

(10) Patent No.: US 11,112,982 B2
(45) Date of Patent: Sep. 7, 2021

(54) POWER OPTIMIZATION FOR MEMORY SUBSYSTEMS

(71) Applicant: Micron Technology, Inc., Boise, ID (US)

(72) Inventors: Deping He, Boise, ID (US); David A. Palmer, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 77 days.

(21) Appl. No.: 16/552,243

(22) Filed: Aug. 27, 2019

(65) Prior Publication Data

US 2021/0064256 A1    Mar. 4, 2021

(51) Int. Cl.
G11C 29/00 (2006.01)
G06F 3/06 (2006.01)
G06F 11/10 (2006.01)

(52) U.S. Cl.
CPC .......... *G06F 3/0632* (2013.01); *G06F 3/0619* (2013.01); *G06F 3/0625* (2013.01); *G06F 3/0653* (2013.01); *G06F 3/0679* (2013.01); *G06F 11/1076* (2013.01)

(58) Field of Classification Search
None
See application file for complete search history.

(56) References Cited

U.S. PATENT DOCUMENTS

| 2006/0214009 A1* | 9/2006 | Shikata ................. G06F 13/385 235/492 |
| 2011/0219274 A1* | 9/2011 | Cho ........................ G06F 11/00 714/708 |
| 2015/0332735 A1 | 11/2015 | Srinivas et al. |
| 2015/0363261 A1* | 12/2015 | Warnes ................. G06F 11/106 714/721 |
| 2016/0246673 A1* | 8/2016 | Kim .................. H03M 13/1575 |

FOREIGN PATENT DOCUMENTS

| JP | 2010-050955 A | 3/2010 |
| KR | 10-2010-0065446 A | 6/2010 |
| KR | 10-2010-0117134 A | 11/2010 |
| KR | 10-2016-0120935 A | 10/2016 |

OTHER PUBLICATIONS

International Search Report and Written Opinion, PCT/US2020/047243, dated Nov. 25, 2020, 9 pages.

\* cited by examiner

*Primary Examiner* — Guerrier Merant
(74) *Attorney, Agent, or Firm* — Nicholson De Vos Webster & Elliott LLP

(57) ABSTRACT

A processing device initializes a drive strength value of a storage device in an electronic device to a first level. The processing device detects an operation to be performed on the storage device and executes the operation. The processing device monitors a bit error rate occurring in the storage device as a result of executing the operation and determines if the bit error rate satisfies a threshold value. In response to determining that the bit error rate satisfies the threshold value, the processing device increases the drive strength value of the storage device to a second level and re-executes the operation at the increased drive strength value of the storage device.

18 Claims, 3 Drawing Sheets

POWER OPTIMIZATION FOR MEMORY SUBSYSTEMS

TECHNICAL FIELD

The present disclosure generally relates to memory subsystems and more specifically, relates to optimizing the power consumed by memory subsystems.

BACKGROUND ART

A memory sub-system can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to optimizing the power consumed by memory subsystems. A memory sub-system can be a storage device, a memory module, or a hybrid of a storage device and memory module. Examples of storage devices and memory modules are described below in conjunction with FIG. 1. In general, a host system can utilize a memory subsystem that includes one or more memory devices that store data. The host system can provide data to be stored at the memory subsystem and can request data to be retrieved from the memory subsystem.

The amount of power consumed by a memory subsystem can significantly affect the performance of a host system. By efficiently consuming power, an electronic device can achieve improved battery life. Power consumption in an electronic device can be related to the input/output (I/O) power of its storage device. The I/O power can in turn be impacted by the drive strength of the communication channel/bus between a memory subsystem controller and the storage media (e.g., the current, voltage, or impedance value of the signal or communication channel). Memory subsystems often operate using a fixed drive strength, which is typically set to a sufficient level to withstand variations in process, voltage, temperature, manufacturing, etc. that may impact signal integrity of the communication channel/bus. Operating the memory subsystem at a single fixed drive strength, however, can result in inefficient power consumption.

Aspects of the present disclosure address the above and other deficiencies by dynamically determining the drive strength to be used by the memory subsystem. A dynamic drive strength enables the memory subsystem to maintain reliable signal integrity while minimizing power consumption. For example, drive strength can be set in response to detecting various power events in the electronic device and by monitoring errors occurring as a result of executing commands (e.g., read operations).

Figure 1:
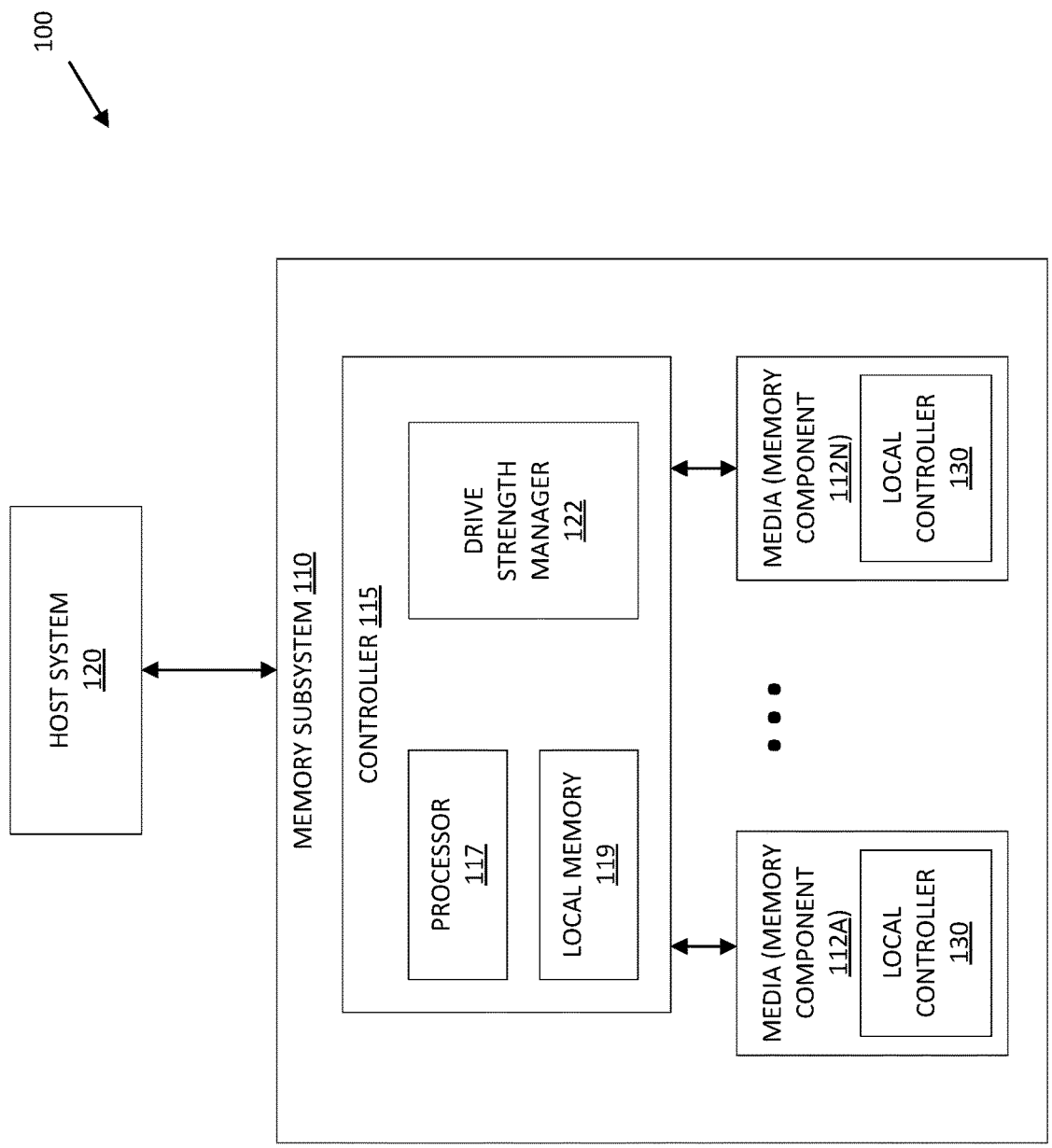
FIG. 1 illustrates an example computing environment that includes a memory subsystem in accordance with some embodiments of the present disclosure.

FIG. 1 illustrates an example computing environment 100 that includes a memory subsystem 110 in accordance with some embodiments of the present disclosure. The memory subsystem 110 can include media, such as memory components 112A to 112N (also hereinafter referred to as "memory devices"). The memory components 112A to 112N can be volatile memory components, non-volatile memory components, or a combination of such. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, an electronic device, embedded computer (e.g., one included in a vehicle, industrial equipment, or a networked commercial device), or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a drive strength manager 122. The drive strength manager dynamically determines the drive strength to be used by the memory subsystem by detecting various power events in the electronic device and by monitoring errors occurring as a result of executing commands (e.g., read operations). In certain embodiments, the drive strength manager 122 receives a command from the host system 120 to perform an operation. For example, the operation could be a read operation to be performed on a memory component 112. In other examples, the operation could be a write operation that may trigger a read operation to be performed on the memory component or another operation that enables the drive strength manager 122 to receive or determine a bit error rate of that operation. The drive strength manager 122 monitors bit errors occurring in the memory subsystem as a result of executing the operation on the memory component. In general, bit errors may refer to errors that can be induced in a memory component by a variety of reasons, such as signal interference on a bus when data is read from or written to a memory component, interference from operations performed on adjacent cells of memory components, data retention issues due to charge leakage in memory components, wearing out of memory components (caused due to a number of repeated operations performed on s memory components), and so on. For instance, the wearing out of a memory component can cause the probability of bit errors to increase as more program/erase (P/E) cycles (i.e., write operations) are performed on the memory component.

In some embodiments, the memory components 112A to 112N can be managed memory devices (e.g., managed NAND), which is a raw memory device combined with a local controller 130 for memory management within the same memory device package. A local controller 130 can include a strength manager 122.

In certain embodiments, the drive strength manager 122 adaptively determines a drive strength value of the memory subsystem in response to the bit error rate. For example, the drive strength manager 122 increases the drive strength value of the memory subsystem if the bit error rate satisfies (e.g., meets or exceeds) a threshold value and re-attempts to execute the operation at the increased drive strength value. Thus, by adaptively determining the drive strength value of the memory subsystem in response to bit errors but otherwise maintaining a low drive strength value, the drive strength manager 122 achieves improved power usage (i.e., I/O power) of the memory subsystem, leading to improved battery life of the host system.

In certain embodiments, the drive strength manager 122 can utilize a range of drive strength values stored in the controller 115 to select a particular drive strength value for the memory subsystem 110. As used herein, the drive strength value can correspond to a particular current, voltage, or impedance setting that can be applied by the controller 115 to the memory subsystem. In one example, the drive strength values can be a range of values (e.g., 25 ohms, 35 ohms, 50 ohms, or 75 ohms) provided by a variable resistor setting in the controller 115. This variable resistor setting can be utilized by the drive strength manager 122 to set a drive strength value for the memory subsystem.

In certain embodiments, the drive strength manager 122 resets the drive strength value of the memory subsystem to an initial level in response to detecting power events in the host system. Examples of power events include a sleep event, a power-off event, or a reset event triggered by the host system. A power event can also include, for instance, a timer-based event triggered by the host system that causes the drive strength manager 122 to reset the drive strength. In some examples, a power event is an event that is triggered when a threshold number (e.g., 100) operations have been executed by the controller 115 on the memory components of the memory subsystem 110.

In some embodiments, the controller 115 includes at least a portion of the drive strength manager 122. For example, the controller 115 can include a processor 117 (processing device) configured to execute instructions stored in local memory 119 for performing the operations described herein. In some embodiments, the drive strength manager 122 is part of the host system 120, an application, or an operating system. The operations performed by the drive strength manager 122 are described in detail below.

Figure 2:
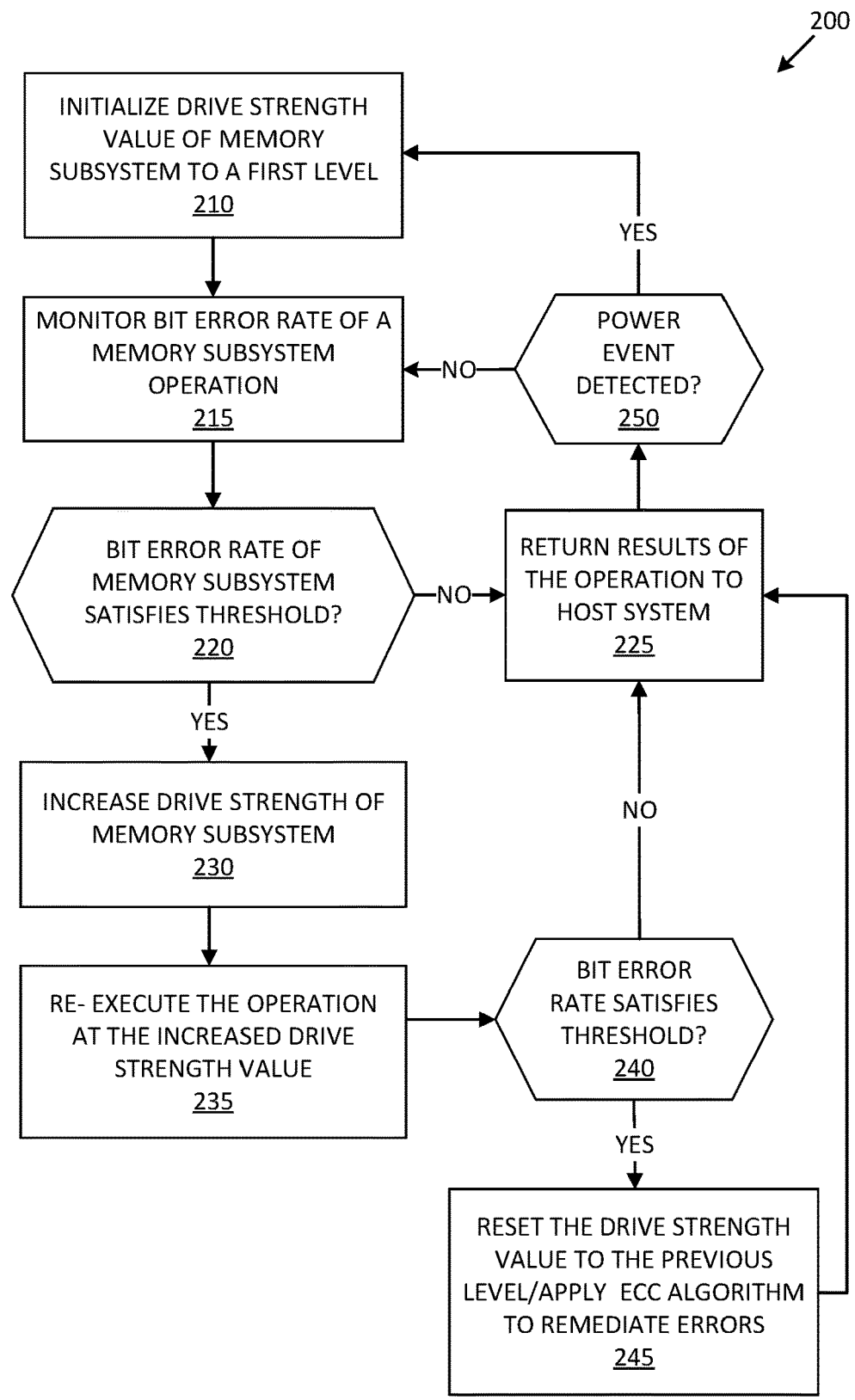
FIG. 2 is a flow diagram of an example method performed by a processing device in accordance with some embodiments of the present disclosure.

FIG. 2 is a flow diagram of an example method 200 performed by a processing device in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the drive strength manager 122 and the controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device initializes a drive strength value of the memory subsystem (e.g., 110) to a first level. In one embodiment, the first level is the weakest feasible level of the drive strength value (e.g., 25 ohms) that the host system 120 can operate in under optimal environmental conditions (e.g., optimal temperature, optimal host system voltage, etc.). For instance, when the host system 120 is initially powered on, the drive strength manager 122 initializes a drive strength value of the memory subsystem to the first level.

At operation 215, the processing device monitors a bit error rate of an operation to the memory subsystem. As noted above, the operation could be a read or other operation performed on a memory component 112 in the memory subsystem 110.

At operation 220, the processing device determines if the bit error rate occurring in the memory subsystem as a result of executing the operation satisfies (e.g., meets or exceeds) a threshold value. For example, the bit error rate can represent a fraction of the total bits retrieved during an operation that are erroneous. In one example, the bit error rate threshold value is a pre-defined value (configured by a user or at the time of manufacture of the memory subsystem), which, when exceeded, represents data that cannot be corrected by a first error correction algorithm. For example, the memory subsystem can employ multiple error-correcting codes or algorithms. A first error-correcting algorithm (e.g., a low-density parity-check code (LDPC)) can be faster and/or less complex than a second error-correcting algorithm (e.g., a high-density parity-check code (HDPC)). As a trade off for speed and less complexity, however, the first error-correcting algorithm can face a lower limit of the number of bits it is able to correct as compared to the second error-correcting algorithm. In one embodiment, the bit error rate threshold is set to the limit of the first error-correcting algorithm.

If the processing device determines that the bit error rate has not satisfied the threshold value, at operation 225, the processing device returns results of execution of the operation to the host system. In one embodiment, the processing device utilizes the first error-correcting algorithm to correct any erroneous bits and the results of the execution include the corrected bits.

If the bit error rate has satisfied the threshold value, at operation 230, the processing device increases the drive strength value of the memory subsystem from the first level to a second level. By increasing the drive strength value to the second level, the processing device can execute the operation again in an effort to decrease the bit error rate.

At operation 235, the processing device attempts to re-execute the operation at the increased drive strength value of the memory subsystem. Executing the operation at a greater drive strength can improve signal quality on the transmission path between the controller 115 and memory component(s) 112 and, as a result, decrease the likelihood of bit errors.

At operation 240, the processing device determines if the bit error rate of the re-executed operation satisfies the threshold value. For example, if the processing device determines that the bit error rate occurring in the memory subsystem as a result of re-executing the operation at the increased drive strength is within the threshold value, then the processing device maintains the drive strength value of the memory subsystem at the second level and, at operation 225, returns results of re-executing the operation at the increased drive strength value to the host system. As described above, the processing device can utilize the first error-correcting algorithm to correct any erroneous bits and the results of the execution include the corrected bits. In one embodiment, maintaining the drive strength at the second level includes executing operations at the second drive strength level until the memory subsystem detects a trigger to increase the drive strength again (e.g., at operation 230) or decrease the drive strength (as described below).

If the bit error rate of the re-executed operation satisfies the threshold value, at operation 245, the processing device applies the second error-correcting algorithm to remediate the bit errors detected in data of the re-executed operation. In certain embodiments, the processing device may reset the drive strength value of the memory subsystem to a previous level prior to the application of the second error-correcting algorithm. For example, if the increased drive strength did not bring the bit error rate within the threshold, the memory subsystem can return to the lower drive strength value to conserve energy in subsequent operations. Upon application of the second error-correcting algorithm, at block 225, the processing device returns the corrected data to the host system.

In some embodiments, at operation 250, the processing device detects an occurrence of a power event (e.g., in the host system) or other trigger to reset the drive strength (collectively referred to as a power event). In response to detecting the power event, the processing device resets the drive strength value of the memory subsystem to the first level (or default or initial level). As noted above, examples of power events include a sleep event, a power off event, or a reset event triggered by the host system. Other triggers to reset the drive strength can also include, for instance, an expiration of a timer following an increase in drive strength, a threshold number (e.g., 100) operations executed following an increase in drive strength, etc. If a power event is not detected at operation 250, the process continues to operation 210, at which the processing device detects another operation to the memory subsystem.

The operations of method 200 allow the memory subsystem 110 to operate in an energy efficient manner by dynamically adjusting the drive strength to the lowest level that keeps the bit error rate within a threshold of a less complex and/or faster error-correcting algorithm when possible. When the bit error rate is not correctable by a simple increase in drive strength, the memory subsystem 110 continues to conserve power and employs the more complex and/or slower error-correcting algorithm.

Figure 3:
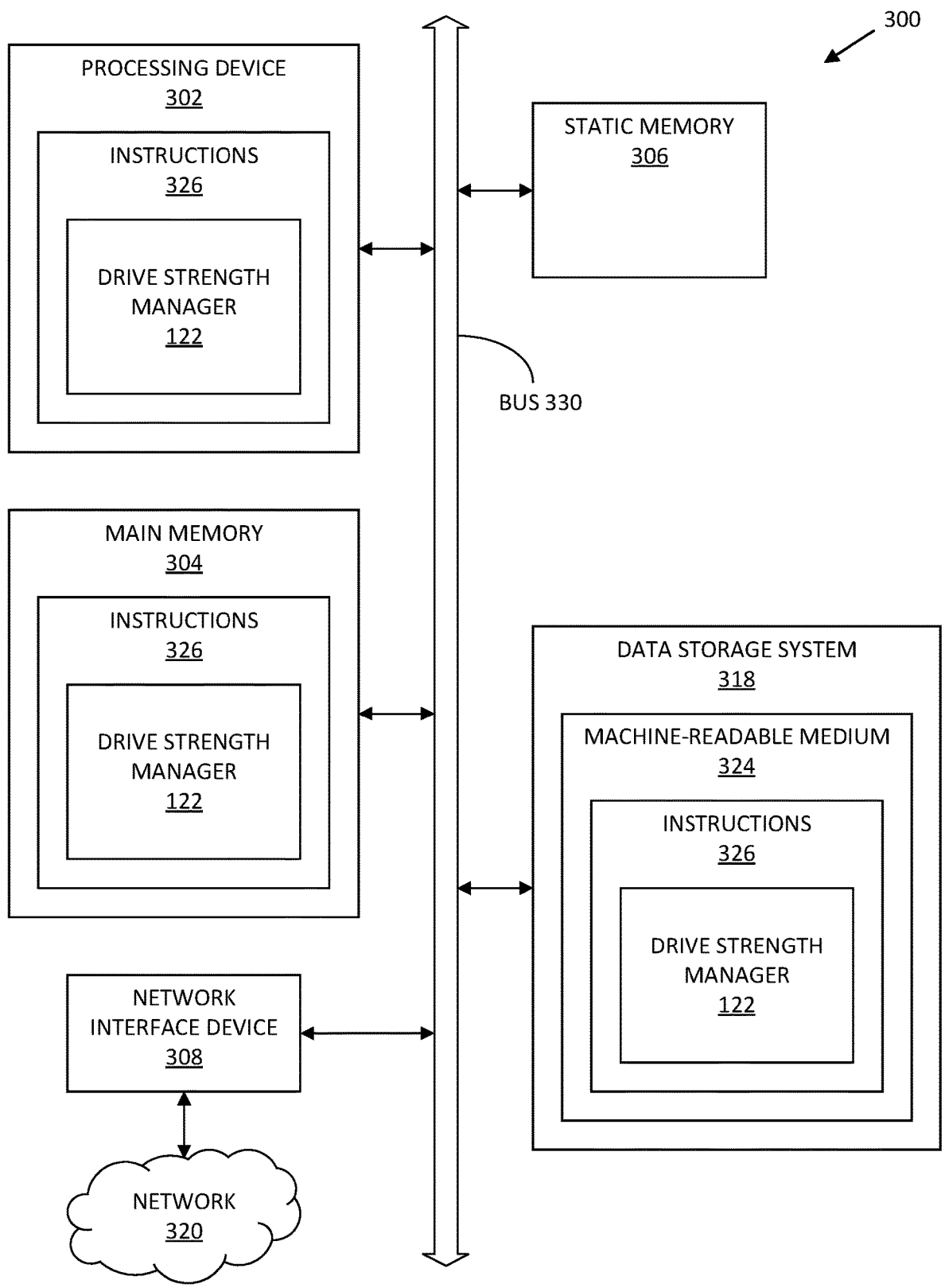
FIG. 3 is a block diagram of an example computer system in which embodiments of the present disclosure may operate.

FIG. 3 illustrates an example machine of a computer system 300 within which a set of instructions, for causing the machine to perform any one or more of the methodologies discussed herein, can be executed. In some embodiments, the computer system 300 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the drive strength manager 122 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage system 318, which communicate with each other via a bus 330.

Processing device 302 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 302 can also be one or more special-purpose processing devices such as an application specific integrated circuit (ASIC), a field programmable gate array (FPGA), a digital signal processor (DSP), network processor, or the like. The processing device 302 is configured to execute instructions 326 for performing the operations and steps discussed herein. The computer system 300 can further include a network interface device 308 to communicate over the network 320.

The data storage system 318 can include a machine-readable storage medium 324 (also known as a computer-readable medium) on which is stored one or more sets of instructions 326 or software embodying any one or more of the methodologies or functions described herein. The instructions 326 can also reside, completely or at least partially, within the main memory 304 and/or within the processing device 302 during execution thereof by the computer system 300, the main memory 304 and the processing device 302 also constituting machine-readable storage media. The machine-readable storage medium 324, data storage system 318, and/or main memory 304 can correspond to the memory subsystem 110 of FIG. 1.

In one embodiment, the instructions 326 include instructions to implement functionality corresponding to drive strength manager (e.g., the drive strength manager 122 of FIG. 1). While the machine-readable storage medium 324 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented method 200 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   initializing a drive strength value of a memory subsystem to a first level;
   executing an operation on the memory subsystem with the drive strength at the first level;
   determining that a bit error rate occurring in the memory subsystem as a result of executing the operation satisfies a threshold value;
   in response to determining that the bit error rate satisfies the threshold value, increasing the drive strength value of the memory subsystem to a second level;
   determining an updated bit error rate based on re-executing the operation at the increased drive strength;
   determining that the updated bit error rate satisfies the threshold value;
   in response to determining that the updated bit error rate satisfies the threshold value, decreasing the drive strength value of the memory subsystem to the first level.

2. The method of claim 1, further comprising:
   executing a subsequent operation with the drive strength value set at the first level;
   determining that a subsequent bit error rate occurring in the memory subsystem as a result of executing the subsequent operation satisfies the threshold value;
   in response to determining that the subsequent bit error rate satisfies the threshold value, increasing the drive strength value of the memory subsystem to the second level;
   determining, based on re-executing the subsequent operation at the increased drive strength value, that the bit error rate is within the threshold value;
   maintaining the drive strength value of the memory subsystem at the second level for one or more operations following the subsequent operation; and
   returning results of re-executing the subsequent operation at the increased drive strength value to a host system.

3. The method of claim 1, further comprising:
   applying an error correcting code (ECC) to correct bit errors detected in data of the re-executed operation; and
   returning the corrected data to a host system.

4. The method of claim 2, further comprising:
   detecting an occurrence of a power event in a host system; and
   in response to detecting the power event, re-initializing the drive strength value of the memory subsystem to the first level.

5. The method of claim 4, wherein the power event comprises at least one of a sleep event, a power off event, or a reset event triggered by the host system.

6. The method of claim 4, wherein the power event is a timer-based event triggered by the host system or an event that is triggered when a threshold number of operations have been executed on the memory subsystem.

7. A non-transitory computer-readable storage medium comprising instructions that, when executed by a processing device, cause the processing device to:
   initialize a drive strength value of a memory subsystem to a first level;
   execute an operation on the memory subsystem with the drive strength at the first level;
   determine that a bit error rate occurring in the memory subsystem as a result of executing the operation on the memory subsystem satisfies a threshold value;
   in response to determining that the bit error rate satisfies the threshold value, increase the drive strength value of the memory subsystem to a second level;
   re-execute the operation at the increased drive strength value of the memory subsystem;

determine, based on re-executing the operation at the increased drive strength value, that an updated bit error rate satisfies the threshold value; and in response to determining that the updated bit error rate satisfies the threshold value, decrease the drive strength value of the memory subsystem to the first level.

8. The non-transitory computer-readable storage medium of claim 7, wherein the processing device is further configured to:

execute a subsequent operation with the drive strength value at the first level;

determine that a subsequent bit error rate occurring in the memory subsystem as a result of executing the subsequent operation satisfies the threshold value;

in response to determining that the subsequent bit error rate satisfies the threshold value, increase the drive strength value of the memory subsystem to the second level;

determine, based on re-executing the subsequent operation at the increased drive strength value, that the bit error rate does not satisfy the threshold value;

maintain the drive strength value of the memory subsystem at the second level for one or more operations following the subsequent operation; and return results of re-executing the subsequent operation at the increased drive strength value to a host system.

9. The non-transitory computer-readable storage medium of claim 7, wherein the processing device is further configured to:

apply an error correcting code (ECC) to correct bit errors detected in data of the re-executed operation; and return the corrected data to a host system.

10. The non-transitory computer-readable storage medium of claim 8, wherein the processing device is further configured to:

detect an occurrence of a power event in the host system; and in response to detecting the power event, re-initialize the drive strength value of the memory subsystem to the first level.

11. The non-transitory computer-readable storage medium of claim 10, wherein the power event comprises at least one of a sleep event, a power off event, or a reset event triggered by the host system.

12. The non-transitory computer-readable storage medium of claim 10, wherein the power event is a timer-based event triggered by the host system or an event that is triggered when a threshold number of operations have been executed on the memory subsystem.

13. A system comprising:
a memory component; and
a processing device, operatively coupled with the memory component, to:
initialize a drive strength value of a memory subsystem to a first level;
execute an operation on the memory subsystem with the drive strength at the first level;

determine that a bit error rate occurring in the memory subsystem as a result of executing the operation satisfies a threshold value; and in response to determining that the bit error rate satisfies the threshold value, increase the drive strength value of the memory subsystem to a second level;

re-executing the operation at the increased drive strength;

determine an updated bit error rate based on re-executing the operation at the increased drive strength;

determine that the updated bit error rate satisfies the threshold value;

in response to determining that the updated bit error rate satisfies the threshold value, decrease the drive strength value of the memory subsystem to the first level.

14. The system of claim 13, wherein the processing device is further to:

execute a subsequent operation with the drive strength value set at the first level;

determine that a subsequent bit error rate occurring in the memory subsystem as a result of executing the subsequent operation satisfies the threshold value;

in response to determining that the subsequent bit error rate satisfies the threshold value, increase the drive strength value of the memory subsystem to the second level;

determine, based on re-executing the subsequent operation at the increased drive strength value, that the bit error rate is within the threshold value; and maintain the drive strength value of the memory subsystem at the second level for one or more operations following the subsequent operation; and return results of re-executing the subsequent operation at the increased drive strength value to a host system.

15. The system of claim 14, wherein the processing device is further to:

apply an error correcting code (ECC) to correct bit errors detected in data of the re-executed operation; and return the corrected data to a host system.

16. The system of claim 14, wherein the processing device is further configured to:

detect an occurrence of a power event in the host system; and in response to detecting the power event, re-initialize the drive strength value of the memory subsystem to the first level.

17. The system of claim 16, wherein the power event comprises at least one of a sleep event, a power off event, or a reset event triggered by the host system.

18. The system of claim 16, wherein the power event is a timer-based event triggered by the host system or an event that is triggered when a threshold number of operations have been executed on the memory subsystem.

* * * * *